(12) United States Patent
Obata

(10) Patent No.: US 7,590,502 B2
(45) Date of Patent: Sep. 15, 2009

(54) TESTING APPARATUS FOR STEERING APPARATUS

(75) Inventor: Hiroshi Obata, Okazaki (JP)

(73) Assignee: JTEKT Corporation, Osaka (JP)

( * ) Notice: Subject to any disclaimer, the term of this patent is extended or adjusted under 35 U.S.C. 154(b) by 60 days.

(21) Appl. No.: 12/076,362

(22) Filed: Mar. 17, 2008

(65) Prior Publication Data

US 2008/0243399 A1    Oct. 2, 2008

(30) Foreign Application Priority Data

Mar. 19, 2007    (JP) ............................. 2007-070607

(51) Int. Cl.
*G01L 25/00*    (2006.01)
(52) U.S. Cl. ........................................ 702/113
(58) Field of Classification Search ............... 702/41, 702/112, 113, 115; 701/29, 31, 34, 41, 43, 701/46
See application file for complete search history.

(56) References Cited

U.S. PATENT DOCUMENTS 7,100,735 B2 *    9/2006    Burton et al. ............... 180/446

FOREIGN PATENT DOCUMENTS

| GB | 2249068 | 4/1992 |
|---|---|---|
| JP | 2003-261046 | 9/2003 |
| JP | 2005-172528 | 6/2005 |

* cited by examiner

*Primary Examiner*—Drew A Dunn
*Assistant Examiner*—Stephen J Cherry
(74) *Attorney, Agent, or Firm*—Rabin & Berdo, P.C.

(57) ABSTRACT

The testing apparatus tests a steering apparatus including a torque sensor which detects a steering torque, a steering actuator which applies a steering force to a steering mechanism, and a controller which controls the steering actuator based on an output of the torque sensor. The apparatus includes a test signal generating unit which generates a test signal of a sine sweep waveform simulating an output signal of the torque sensor, a driving signal generating unit which generates a driving signal according to the test signal generated by the test signal generating unit and supplies the driving signal to the steering actuator, and a torque signal monitoring unit which acquires a torque signal outputted from the torque sensor.

6 Claims, 7 Drawing Sheets

TESTING APPARATUS FOR STEERING APPARATUS

BACKGROUND OF THE INVENTION

1. Field of the Invention

The present invention relates to a testing apparatus for a steering apparatus which includes a controller for controlling a steering actuator according to a steering detection output of a torque sensor.

2. Description of Related Art

Conventionally, a motor vehicle is mounted with an electric power steering apparatus which performs a steering assist operation by applying a steering assist force to a steering mechanism according to a steering torque applied to a steering wheel. More specifically, the electric power steering apparatus includes a torque sensor which detects the steering torque applied to the steering wheel, an electric motor which applies the steering assist force to the steering mechanism, and an in-vehicle controller (ECU: electronic control unit) which controls the driving of the electric motor according to the steering torque.

A control parameter (control constant) to be employed by the in-vehicle controller for controlling the electric motor is preliminarily set for each type of motor vehicles. That is, the control parameter is set such that a steering characteristic of a standard motor vehicle of a specific vehicle type is equal to an ideal or nominal steering characteristic (target characteristic).

However, mass-produced complete motor vehicles do not have exactly the same characteristics as the standard motor vehicle, but suffer from cumulative variations in mechanical characteristics of individual components. Such mechanical variations vary from one motor vehicle to another. Therefore, the steering characteristic of the motor vehicle mounted with the electric power steering apparatus is not necessarily equal to the target characteristic, making it difficult to provide an ideal steering feeling.

A testing apparatus for a steering apparatus disclosed in Japanese Unexamined Patent Publication No. 2003-261046 is configured to detect abnormality of a steering apparatus by monitoring an output to a steering motor while applying a rotation torque to an input shaft of the steering apparatus, and comparing the output with a reference value. Even with the use of this testing apparatus, it is impossible to adjust the control parameter according to the mechanical variations among different motor vehicles, making it difficult to provide a desired steering characteristic.

SUMMARY OF THE INVENTION

It is an object of the present invention to provide a testing apparatus for a steering apparatus which makes it possible to achieve a target steering characteristic irrespective of mechanical variations among different motor vehicles.

The present invention relates to a testing apparatus for a steering apparatus including a torque sensor which detects a steering torque, a steering actuator which applies a steering force to a steering mechanism, and a controller which controls the steering actuator based on an output of the torque sensor. The testing apparatus includes: a test signal generating unit which generates a test signal of a sine sweep waveform simulating an output signal of the torque sensor; a driving signal generating unit which generates a driving signal according to the test signal generated by the test signal generating unit and supplies the driving signal to the steering actuator; and a torque signal monitoring unit which acquires a torque signal outputted from the torque sensor. The sine sweep waveform is a sine wave generated by varying a frequency (for example, by steadily increasing or reducing the frequency).

With this arrangement, the test signal of the sine sweep waveform is generated by the test signal generating unit, and the steering actuator is driven by the driving signal generated according to the test signal. At this time, the torque signal outputted from the torque sensor is monitored to obtain the response characteristic of the steering mechanism with respect to the test signal. Based on the monitored torque signal, a control parameter for controlling the steering actuator is properly set to achieve a target steering characteristic.

More specifically, a complete motor vehicle mounted with the steering apparatus is tested in the aforementioned manner, whereby the control parameter suitable for achieving the target steering characteristic can be set to accommodate mechanical variations among different motor vehicles. Thus, the target steering characteristic can be achieved irrespective of the mechanical variations among the different motor vehicles.

The testing apparatus preferably further includes a processing unit which processes the torque signal acquired by the torque signal monitoring unit to generate a control parameter which defines a control characteristic of the steering actuator to be utilized by the controller. This arrangement makes it possible to provide the control parameter suitable for achieving the target steering characteristic.

The processing unit preferably includes a control parameter setting unit which sets the control parameter so that a resonance point of the steering mechanism is equal to a predetermined design value.

The resonance point of the steering mechanism is a mechanical characteristic of the steering apparatus (preferably a mechanical characteristic of the steering apparatus mounted in the motor vehicle). Therefore, the target steering characteristic can be achieved by setting the control parameter so that the resonance point of the steering mechanism is equal to a resonance point of the steering apparatus observed in a standard motor vehicle.

The testing apparatus preferably further includes a parameter writing unit which writes the control parameter generated by the processing unit in the controller. With this arrangement, the control parameter properly adjusted for the motor vehicle can be written in the controller mounted in the motor vehicle, making it possible to achieve the target steering characteristic.

The control parameter preferably includes a phase compensation constant to be employed for phase compensation of the torque signal outputted from the torque sensor. With this arrangement, the phase compensation constant can be set according to the response characteristic of the steering mechanism (particularly, the steering mechanism of the steering apparatus mounted in the motor vehicle). This makes it possible to effectively achieve the target steering characteristic.

The foregoing and other objects, features and effects of the present invention will become more apparent from the following detailed description of preferred embodiments with reference to the attached drawings.

DETAILED DESCRIPTION OF PREFERRED EMBODIMENTS

Figure 1:
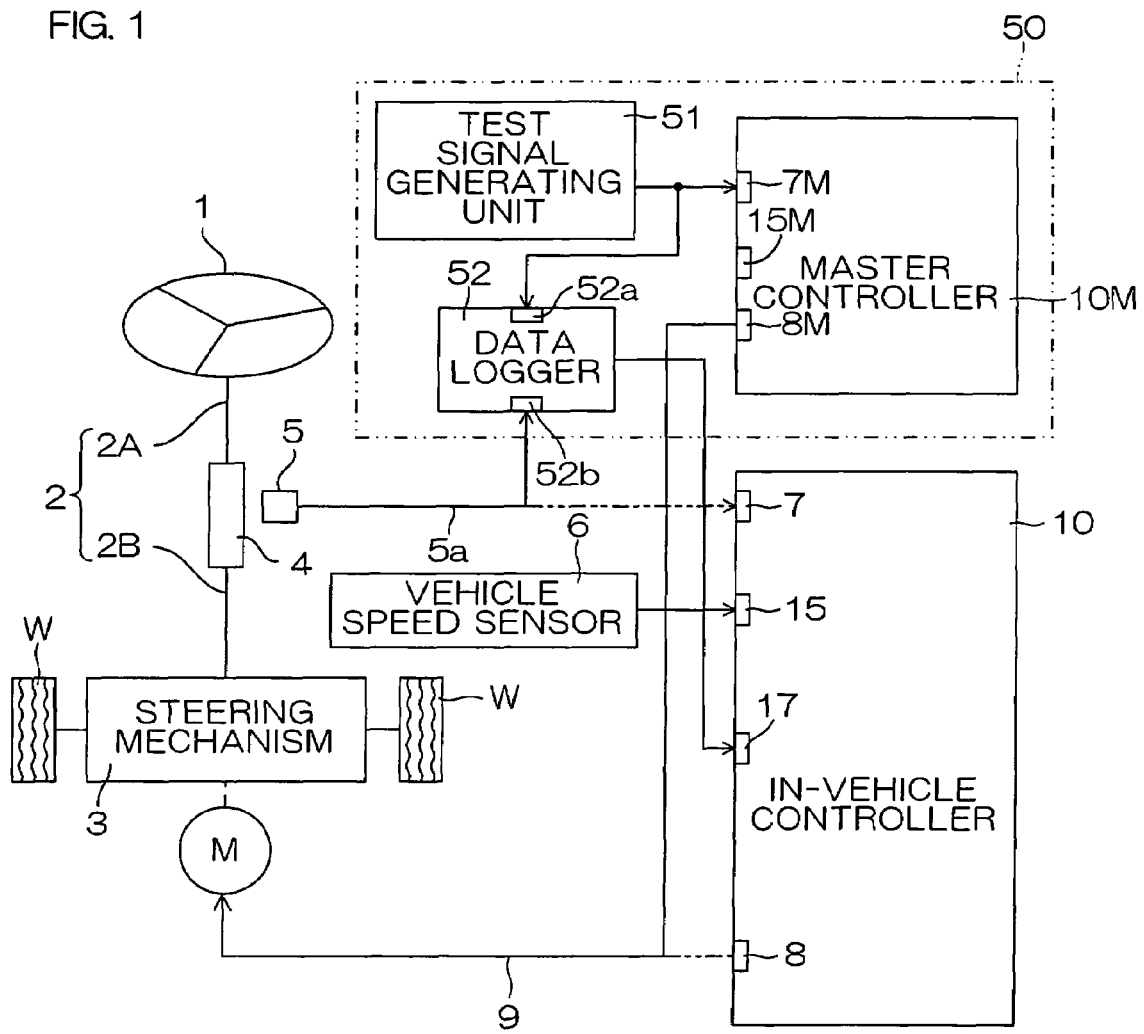
FIG. 1 is a block diagram showing the electrical construction of an electric power steering apparatus to which a testing apparatus according to one embodiment of the present invention is applied.

FIG. 1 is a block diagram showing the electrical construction of an electric power steering apparatus to which a testing apparatus according to one embodiment of the present invention is applied. A steering torque applied to a steering wheel 1 (operation unit) is mechanically transmitted to a steering mechanism 3 through a steering shaft 2. A steering assist force from an electric motor M (steering actuator) is transmitted to the steering mechanism 3 through a speed reducing mechanism (not shown) or by a direct drive method. The steering mechanism 3 receives torques from the steering shaft 2 and the electric motor M to turn steerable vehicle wheels W.

The steering shaft 2 is divided into an input shaft 2A coupled to the steering wheel 1 and an output shaft 2B coupled to the steering mechanism 3. The input shaft 2A and the output shaft 2B are coupled to each other by a torsion bar 4. Torsion occurs in the torsion bar 4 according to the steering torque. The direction and the amount of the torsion are detected by a torque sensor 5. A torque signal outputted from the torque sensor 5 is inputted to an in-vehicle controller (ECU: electronic control unit) 10.

In addition to the torque signal outputted from the torque sensor 5, a vehicle speed signal outputted from a vehicle speed sensor 6 is inputted to the in-vehicle controller 10. The torque signal outputted from the torque sensor 5 is inputted to a torque signal input portion 7 of the in-vehicle controller 10 via a torque signal line 5a. A driving signal line (power supply line) 9 is connected to a driving signal output portion 8 of the in-vehicle controller 10, and electric power is supplied to the electric motor M via the driving signal line 9.

A testing apparatus 50 for testing the electric power steering apparatus includes a master controller (ECU: electronic control unit) 10M which serves as a driving signal generating unit, a test signal generating unit 51, and a data logger 52 which functions as a torque signal monitoring unit for monitoring the torque signal and the like.

The master controller 10M also serves the functions of the in-vehicle controller 10, and includes a torque signal input portion 7M and a driving signal output portion 8M.

The test signal generating unit 51 includes an oscillator which generates a test signal of a sine sweep waveform simulating the torque signal. The test signal is inputted to the torque signal input portion 7M of the master controller 10M. The sine sweep waveform is a sine waveform generated by steadily increasing or decreasing a frequency. The range of the variable frequency is selected as including the resonance frequency (resonance point) of the torsion bar 4 and is, for example, 0 to 200 Hz.

The data logger 52 has a test signal input portion 52a and a torque signal input portion 52b. When the electric power steering apparatus is tested, the data logger 52 fetches the test signal outputted from the test signal generating unit 51 and the torque signal outputted from the torque sensor 5 through the test signal input portion 52a and the torque signal input portion 52b, respectively, and monitors the torque signal. The data logger 52 further serves as a processing unit which performs a computing operation for computing a transmission function of the electric power steering apparatus mounted in a motor vehicle based on the fetched test signal and torque signal. In this computing operation, a frequency analysis such as FFT (fast Fourier transform) is performed, and the transmission function is determined based on a frequency characteristic obtained through the frequency analysis.

The torque signal line 5a is switchable between the torque signal input portion 7 of the in-vehicle controller 10 and the torque signal input portion 52b of the data logger 52. The driving signal line 9 is switchable between the driving signal output portion 8 of the in-vehicle controller 10 and the driving signal output portion 8M of the master controller 10M. More specifically, the torque signal line 5a and the driving signal line 9 each have an end provided with a connector for connection to the controller 10 and the like. The connector is detachable for the switching. The switching is permitted with the electric power steering apparatus mounted in the motor vehicle. At this time, there is no need to detach the in-vehicle controller 10.

In FIG. 1, the connection of the torque signal line 5a and the driving signal line 9 for testing the electric power steering apparatus is shown by solid lines, and the connection of the torque signal line 5a and the driving signal line 9 for the ordinary control of the electric motor M to be performed by the in-vehicle controller 10 is shown by two-dot-and-dash lines.

Figure 2:
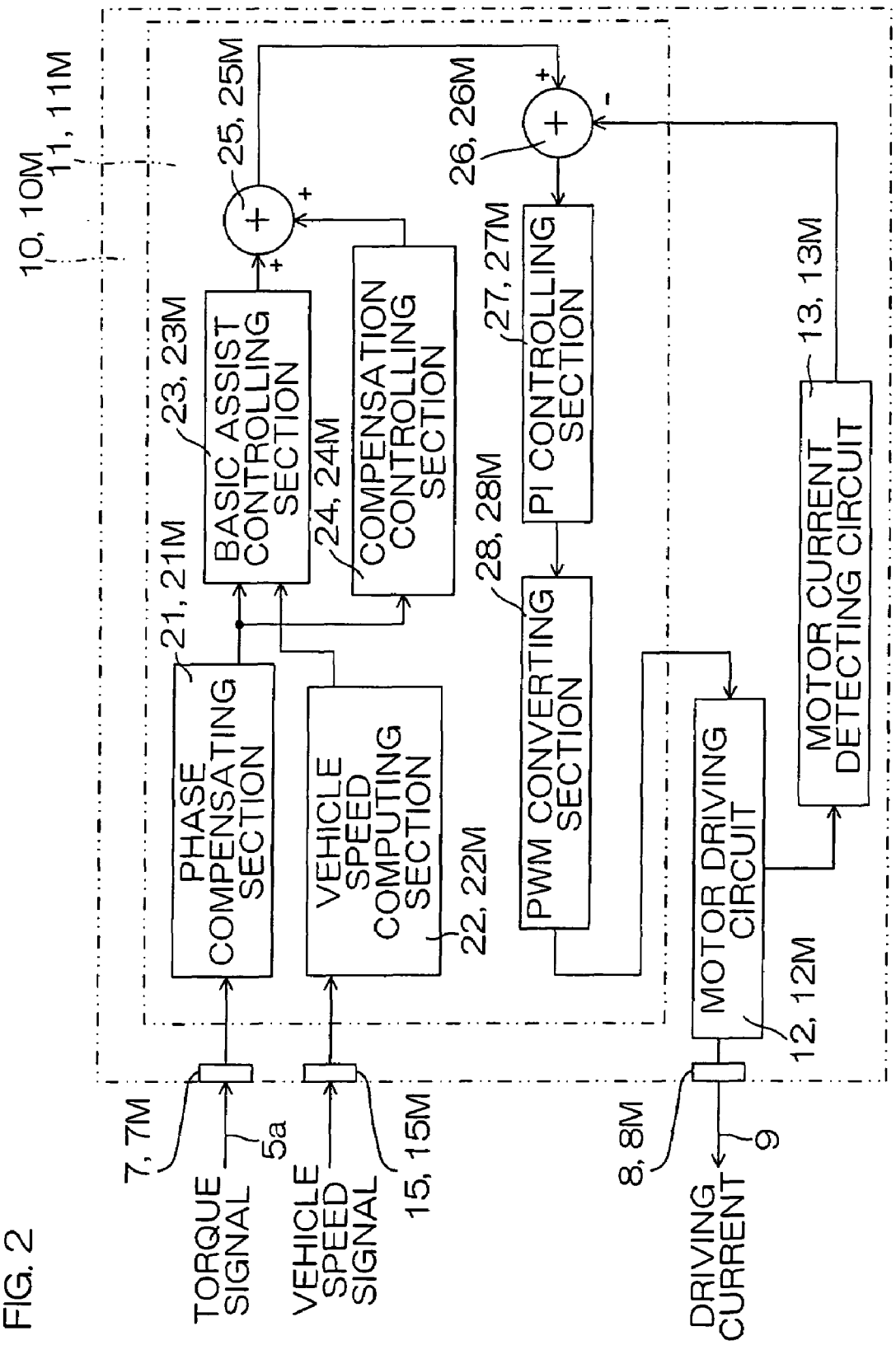
FIG. 2 is a block diagram for explaining the construction of an in-vehicle controller and a master controller.

FIG. 2 is a block diagram for explaining the construction of the in-vehicle controller 10 and the master controller 10M. The in-vehicle controller 10 and the master controller 10M have substantially the same construction and, therefore, the construction of these controllers will be collectively described. Components of the master controller 10M will be denoted by reference characters assigned to the corresponding components of the in-vehicle controller 10 plus a letter "M" suffixed thereto.

The controller 10, 10M determines an electric current command value as a motor driving value according to the steering torque detected by the torque sensor 5, the vehicle speed detected by the vehicle speed sensor 6 and the like, and controls the driving of the electric motor M to apply a steering assist force to the steering mechanism 3 according to the steering torque and the vehicle speed.

The controller 10, 10M includes a microcomputer 11, 11M, a motor driving circuit 12, 12M, and a motor current detecting circuit 13, 13M which detects the value of an electric current flowing through the electric motor M.

The microcomputer 11, 11M generates a motor driving signal in the form of a PWM (pulse width modulation) control signal based on the steering torque (torque signal) inputted thereto through the torque signal input portion 7, 7M, the vehicle speed inputted thereto through a vehicle speed signal input portion 15, 15M and the like, and inputs the PWM driving signal to the motor driving circuit 12, 12M. The motor driving circuit 12, 12M supplies a driving current to the electric motor M according to the PWM driving signal. Then, a driving force generated by the electric motor M is transmitted as the steering assist force to the steering mechanism 3.

The microcomputer 11, 11M includes a CPU (central processing unit) and a memory, and functions as a plurality of functional sections by performing predetermined programs. The functional sections include a phase compensating section 21, 21M, a vehicle speed computing section 22, 22M, a basic assist controlling section 23, 23M, a compensation controlling section 24, 24M, an adding section 25, 25M, a deviation computing section 26, 26M, a PI (proportional integration) controlling section 27, 27M and a PWM converting section 28, 28M.

The phase compensating section 21, 21M performs a phase compensating operation on the torque signal applied through the torque signal input portion 7, 7M to generate a phase-compensated torque signal (indicating a steering torque value).

The vehicle speed computing section 22, 22M computes the value of the vehicle speed of the motor vehicle mounted with the electric power steering apparatus based on the vehicle speed signal inputted through the vehicle speed signal input portion 15, 15M.

The basic assist controlling section 23, 23M determines a basic target current value (basic target driving value) based on the torque signal phase-compensated by the phase compensating section 21, 21M and the vehicle speed value computed by the vehicle speed computing section 22, 22M. More specifically, the basic assist controlling section 23, 23M determines the basic target current value according to a basic assist characteristic (assist map) which defines a relationship of the basic target current value versus the steering torque value and the vehicle speed value. That is, the steering torque value indicated by the torque signal phase-compensated by the phase compensating section 21, 21M and the vehicle speed value determined by the vehicle speed computing section 22, 22M are fitted in the basic assist characteristic to determine the basic target current value.

The compensation controlling section 24, 24M performs various compensation controlling operations to generate compensation current values. Examples of the compensation controlling operations include torque differentiation control, wheel return control, damping control and motor angular acceleration control. The torque differentiation control is performed to generate a compensation current value based on a steering torque differentiation value for compensating for a response delay from the detection of the steering torque by the torque sensor 5 to the application of the steering assist force to the steering mechanism 3. The wheel return control is performed, for example, to generate a compensation current value based on the steering torque, the vehicle speed and a steering angular speed for improving the steerability when the steering wheel 1 is returned to a neutral position. The damping control is performed, for example, to reproduce viscous resistance such as pipe resistance and orifice resistance occurring in cylinders, valves and pipes in a hydraulic power steering apparatus. Specifically, the damping control is performed to generate a compensation current value, based on the steering angular speed and the vehicle speed, to assist a steering operation in a direction opposite to the direction of the steering angular speed for compensation for the viscous resistance for improvement in the convergence and the stability of the motor vehicle. The motor angular acceleration control is performed to generate a compensation current value based on the steering angular acceleration and the like to eliminate an unnatural steering feeling attributable to the inertia of the electric motor M.

The adding section 25, 25M generates a target current value by adding the compensation current values generated by the compensation control section 24, 24M to the basic target current value generated by the basic assist controlling section 23, 23M.

The deviation computing section 26, 26M computes a deviation of the motor current detected by the motor current detecting circuit 13, 13M from the target current value generated by the adding section 25, 25M.

The deviation determined by the deviation computing section 26, 26M is applied to the PI controlling section 27, 27M. The PI controlling section 27, 27M performs a proportional integration operation on the deviation to generate a target voltage value for eliminating the deviation.

The PWM converting section 28, 28M generates the PWM driving signal at a duty ratio according to the target voltage value generated by the PI controlling section 27, 27M, and inputs the PWM driving signal to the motor driving circuit 12, 12M.

Figure 3:
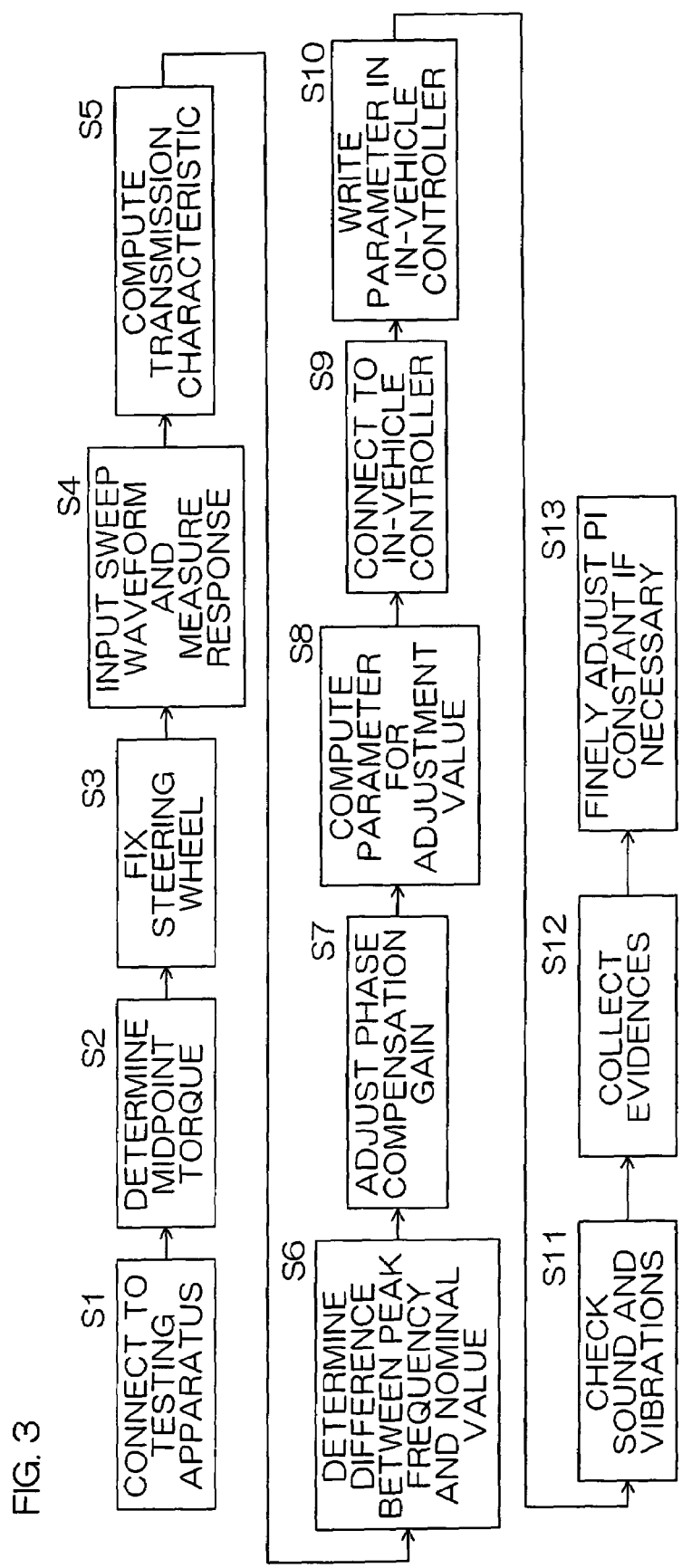
FIG. 3 is a flow chart for explaining a testing operation to be performed on a complete motor vehicle mounted with the electric power steering apparatus in a motor vehicle production line.

FIG. 3 is a flow chart for explaining an electric power steering apparatus test operation to be performed on a complete motor vehicle mounted with the electric power steering apparatus in a motor vehicle production line (mass production line).

First, a test operator connects the torque signal line 5a and the driving signal line 9 to the testing apparatus 50 (Step S1). That is, the torque signal line 5a is disconnected from the torque signal input portion 7 of the in-vehicle controller 10 and connected to the torque signal input portion 52b of the data logger 52. Further, the driving signal line 9 is disconnected from the driving signal output portion 8 of the in-vehicle controller 10 and connected to the driving signal output portion 8M of the master controller 10M. The test signal of the sine sweep waveform generated by the test signal generating unit 51 is inputted to the torque signal input portion 7M of the master controller 10M. The test signal is also inputted to the test signal input portion 52a of the data logger 52.

Then, a midpoint torque determining operation (Step S2) is performed. In the midpoint torque determining operation, midpoint information of the torque sensor 5 is inputted to the master controller 10M. Where the torque sensor 5 outputs a voltage in the range of 0 V to 5 V, for example, a midpoint output (at which the steering torque is zero) is 2.5 V, but the midpoint output has a tolerance of 0.05 V. Therefore, an output of the torque sensor 5 actually provided when no steering torque is applied to the steering wheel 1 is stored as a midpoint output (midpoint information) in the master controller 10M.

In turn, the steering wheel 1 is fixed by a fixing device so as not to be rotated (Step S3). If free rotation of the steering wheel 1 is permitted, it is impossible to measure the response of the electric power steering apparatus. This is because the steering wheel 1 is rotated when the electric motor M is driven by application of the test signal.

Subsequently, the operator causes the test signal generating unit 51 to generate the test signal, and causes the data logger 52 to measure (monitor) the test signal and the torque signal (Step S4). Thus, the response of the electric power steering apparatus to the test signal is measured. At this time, the basic assist characteristic of the basic assist controlling section 23M in the master controller 10M is set such that the basic target current value to be generated is linearly variable (e.g., proportional) to the steering torque, and the functions of the compensation controlling section 24M are disabled. Thus, the response from the motor vehicle can be measured. The PI controlling section 27M has the same settings as the PI controlling section 27 of the in-vehicle controller 10. The PI control defines the control of the electric power steering apparatus per se, but is not dependent upon the construction of the motor vehicle.

After the measurement, the operator causes the data logger 52 to compute the transmission characteristic of the motor vehicle (Step S5). That is, the data logger 52 serves as a transmission characteristic computing unit. For the test, the test signal is generated by the test signal generating unit 51 and inputted to the master controller 10M, which in turn drives the electric motor M. However, the torque signal from the torque sensor 5 is not inputted to the master controller 10M. That is, an open loop is formed. In contrast, where the torque signal line 5a and the driving signal line 9 are connected to the in-vehicle controller 10, the torque signal is fed back to the in-vehicle controller 10 and, therefore, a closed loop is formed. The aforementioned computation of the transmission characteristic performed by the data logger 52 includes computation for determining an open-loop transmission characteristic (open-loop characteristic), and computation for converting the open-loop characteristic into a closed-loop transmission characteristic (closed-loop characteristic).

Then, a difference between the computed transmission characteristic and a target transmission characteristic (nominal transmission characteristic) is determined by the data logger 52 (Step S6). More specifically, a difference between a peak frequency of the computed transmission characteristic (closed-loop characteristic) and a peak frequency (target peak frequency) of the target transmission characteristic (closed-loop characteristic) is determined. The peak frequency of the transmission characteristic represents a resonance point observed due to vibrations of the torsion bar 4. Therefore, the determination of the difference in peak frequency is equivalent to the determination of a difference between a resonance point (target resonance point) observed in an ideal complete motor vehicle and a resonance point actually observed in the motor vehicle being tested.

In turn, the operator determines an adjustment value for a phase compensation gain based on the difference between the target peak frequency and the peak frequency obtained from the motor vehicle being tested (Step S7). The phase compensation gain is a gain (time constant) which is employed for the operation to be performed by the phase compensating section 21, 21M. More specifically, the phase compensating section 21, 21M includes a phase advance element and a phase delay element. In this case, the phase compensation gain is a control parameter to be applied to the phase advance element and the phase delay element.

Subsequently, the operator computes a control parameter for the adjustment value determined for the phase compensation gain with the use of the data logger 52 or an alternative processing apparatus (a personal computer or the like) (Step S8). At this time, the data logger 52 or the processing apparatus serves as a control parameter setting unit. This control parameter is a numerical value which can be written in the in-vehicle controller 10.

Then, the operator switches the torque signal line 5a and the driving signal line 9 from the testing apparatus 50 to the in-vehicle controller 10 (Step S9). More specifically, the torque signal line 5a is connected to the torque signal input portion 7 of the in-vehicle controller 10, and the driving signal line 9 is connected to the driving signal output portion 8 of the in-vehicle controller 10.

In this state, the control parameter computed in Step S8 is written in the in-vehicle controller 10 (Step S10). The writing is achieved with the data logger 52 or the processing apparatus being connected to an input/output interface portion 17 of the in-vehicle controller 10. In this case, the data logger 52 or the processing apparatus serves as a parameter writing unit.

Further, the operator organoleptically (mainly auditorily and tactilely) checks sound and vibrations (Step S11). That is, organoleptically obtained evidences (evidences indicating that the system operates as intended) are collected. Further, quantitative evidences obtained by using the test signal are collected (Step S12). More specifically, the test signal generated by the test signal generating unit 51 is inputted to the torque signal input portion 7 of the in-vehicle controller 10 with the steering wheel 1 fixed, and the test signal and the torque signal outputted from the torque sensor 5 are inputted to the data logger 52. Thus, the test signal of the sine sweep waveform is applied to the in-vehicle controller 10, and the driving signal is applied to the electric motor M from the in-vehicle controller 10 according to the test signal. Then, the steering torque detected by the torque sensor 5 as a result of the driving of the electric motor M is recorded in the data logger 52.

For the collection of the organoleptically obtained evidences (Step S11), the operator evaluates sound and vibrations observed when the sine sweep waveform is applied to the in-vehicle controller 10, and evaluates the raw waveform of the torque signal displayed on a display of the data logger 52.

For the collection of the quantitative evidences, the transmission characteristic of a system including the in-vehicle controller 10 is determined based on the data recorded in the data logger 52. The determined transmission characteristic is an open-loop characteristic and, therefore, is converted into a closed-loop characteristic. Then, the operator confirms that the transmission characteristic obtained through the conversion is equal to the target transmission characteristic.

Where the collection of the organoleptically obtained evidences (Step S11) and the collection of the quantitative evidences (Step S12) do not provide desired results (or these evidences fall outside predefined tolerance ranges), a proportion constant and/or an integration constant are adjusted in the PI controlling section 27 as required (Step S13). Thus, a motor feedback control system is tuned. In general, the motor feedback control system requires no tuning. However, if vibrations occur even after optimization (or tuning) of the control parameter of the complete motor vehicle, maladjustment of the motor feedback system is a probable cause of the vibrations.

Figure 4:
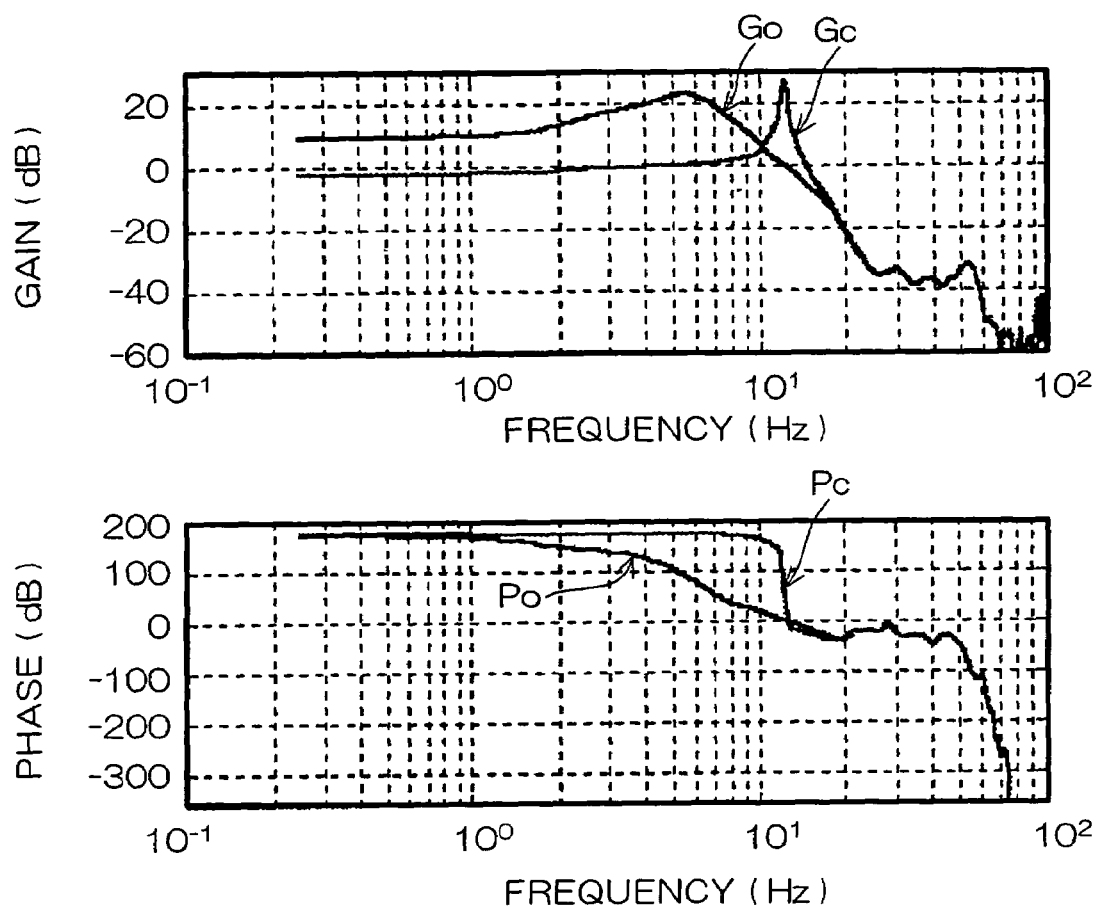
FIG. 4 shows board diagrams showing exemplary transmission characteristics of the completed motor vehicle.

FIG. 4 is board diagrams showing exemplary transmission characteristics of the complete motor vehicle. In FIG. 4, an upper diagram shows a gain, and a lower diagram shows a phase. Curves Go and Po show open-loop characteristics, and curves Gc and Pc show closed-loop characteristics. If data of the open-loop characteristics are known, the closed-loop characteristics (feedback characteristics) can be determined through computation.

A peak appearing on the closed-loop characteristic gain curve Gc represents the resonance frequency of the torsion bar 4. Further, a phase inversion (180-degree inversion) occurs at the resonance frequency on the closed-loop characteristic phase curve Pc.

Figure 5:
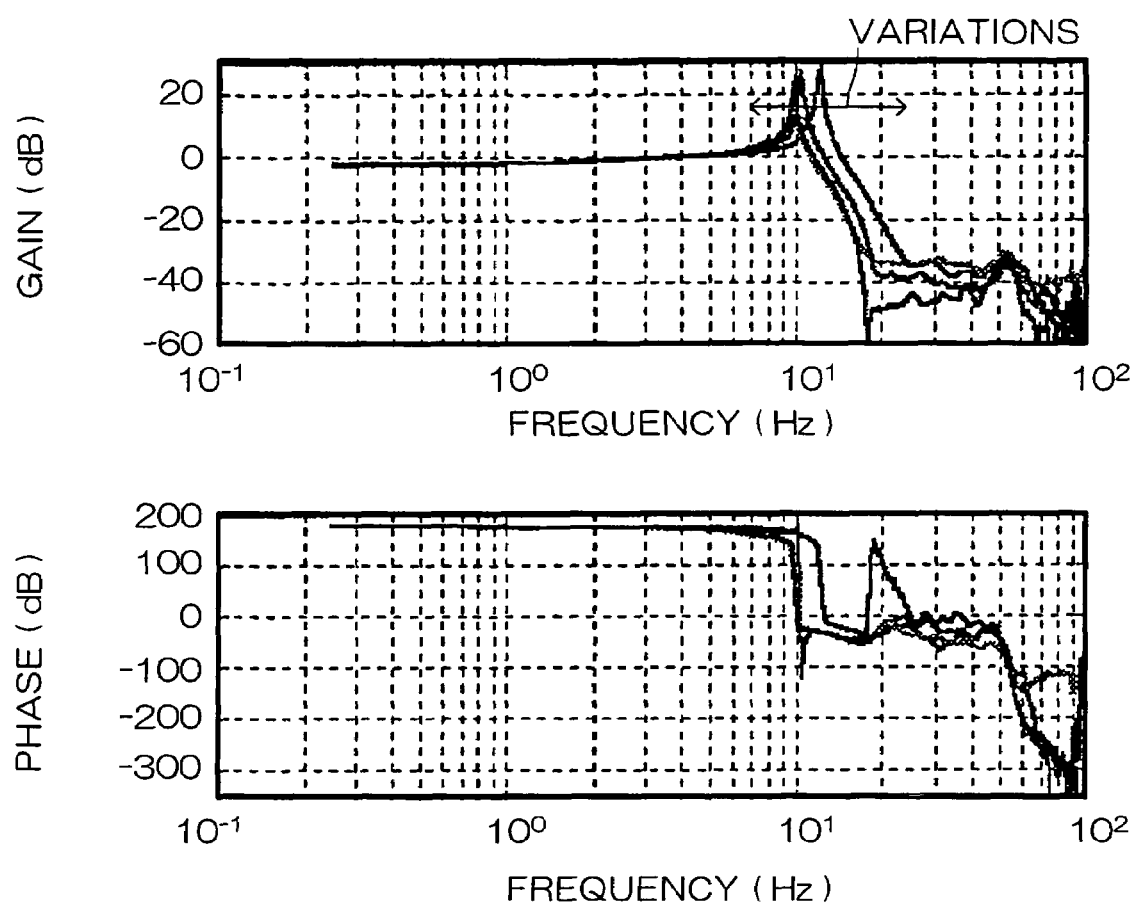
FIG. 5 shows board diagrams showing variations in transmission characteristic (closed loop characteristic) among different motor vehicles.

FIG. 5 is board diagrams showing variations in transmission characteristic (closed-loop characteristic) among different motor vehicles. In FIG. 5, an upper diagram shows a gain, and a lower diagram shows a phase. These diagrams indicate that the motor vehicles vary in transmission characteristic and correspondingly vary in resonance frequency.

Therefore, the control parameter is adjusted so that the transmission characteristic obtained from the motor vehicle of interest is equal to the target transmission characteristic.

Thus, ideal control can be achieved in every motor vehicle. In this embodiment, more specifically, the phase compensation gain is adjusted so that the resonance frequency of the transmission characteristic obtained from the motor vehicle of interest is equal to the resonance frequency (target resonance frequency) of the target transmission characteristic.

Of course, there are variations in open-loop characteristic among different motor vehicles. Therefore, the open-loop characteristic of the motor vehicle of interest may be adjusted to be equal to a target open-loop characteristic preliminarily determined. As can be understood from FIG. 4, however, it is not easy to precisely determine the resonance frequency from the open-loop characteristic. Therefore, more accurate adjustment of the transmission characteristic can be achieved by adjusting the closed-loop characteristic to the target characteristic.

The transmission characteristic of the motor vehicle including the controllers 10, 10M is generally expressed by a secondary characteristic represented by the following expression (1). Therefore, the transmission characteristic is determined based on the data recorded in the data logger 52 by means of a progression analysis tool such as MATLAB (registered trade mark), and then the root (pole/zero) of the transmission characteristic is determined by means of MATLAB (registered trade mark) or a like tool. The root thus determined is applied to the target transmission characteristic, whereby a deviation of the phase compensation gain (from a proper value) is determined. Based on the deviation, a post-adjustment phase compensation constant is determined.

$$G(s) = \frac{\alpha s^2 + \beta s + \gamma}{as^2 + bs + c}. \quad (1)$$

wherein s is a Laplacian, and a, b, c, $\alpha$, $\beta$ and $\gamma$ are constants.

According to this embodiment, as described above, the control parameter of the in-vehicle controller 10 can be tuned for each of the complete motor vehicles in the motor vehicle mass production line. Thus, a desired steering characteristic can be achieved irrespective of the mechanical variations among the motor vehicles. As a result, the variations in steering characteristic among the motor vehicles can be drastically reduced, ensuring uniformity in the automotive performance.

Since the characteristic (the resonance point or the like) of the electric power steering apparatus is determined with the electric power steering apparatus mounted in the motor vehicle, it is possible to find a problem occurring in the electric power steering apparatus and specify a problematic part based on the characteristic. It is also possible to reduce the rate of occurrence of abnormal noise, vibrations and unstable steerability.

Where the measured characteristic is recorded and stored in relation to the serial number of each of the motor vehicle, the characteristic serves as reference information to be employed when trouble-shooting is performed on the motor vehicle.

Figure 6:
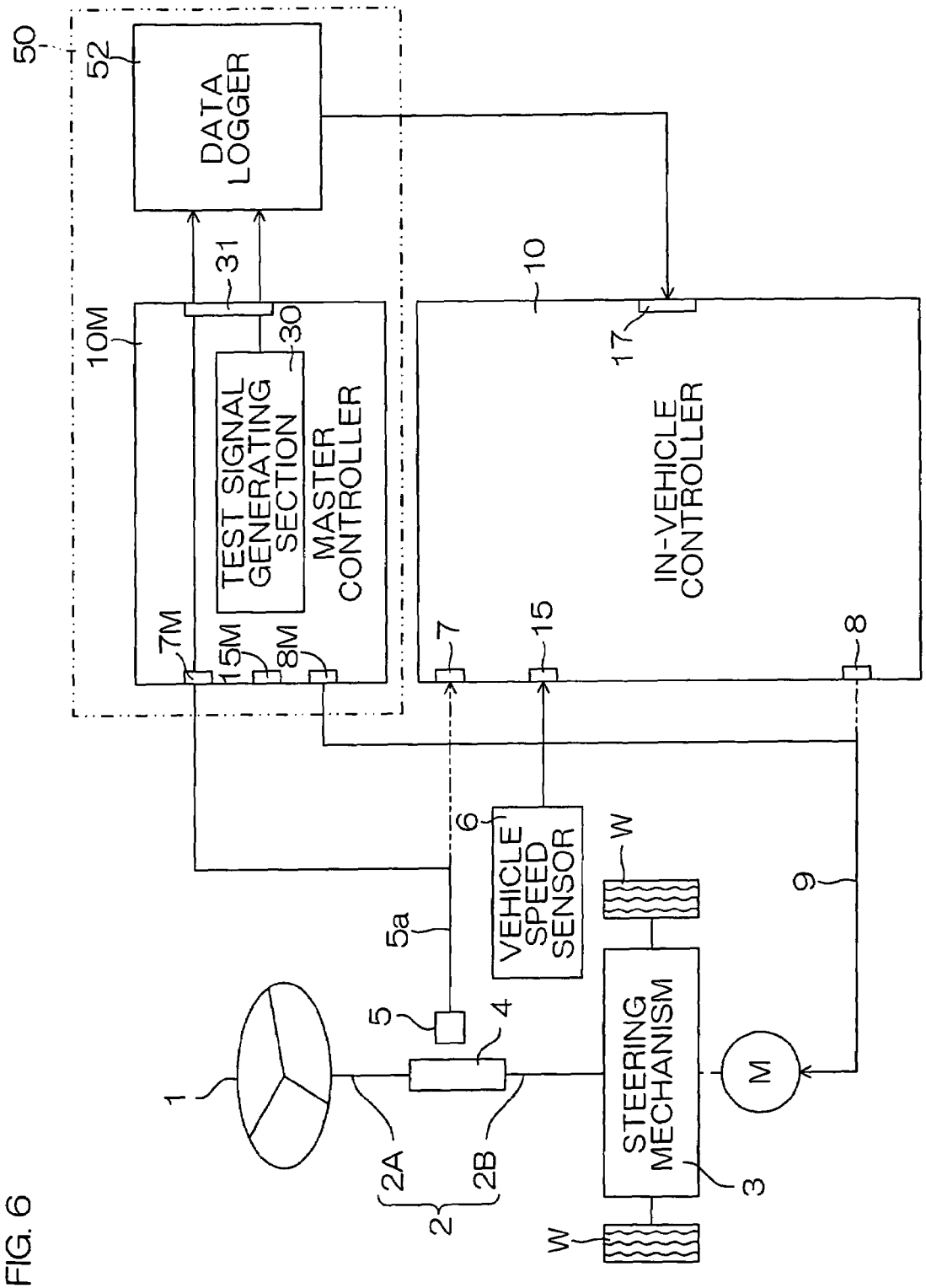
FIG. 6 is a block diagram for explaining the construction of a testing apparatus according to another embodiment of the present invention.

FIG. 6 is a block diagram for explaining the construction of a testing apparatus according to another embodiment of the present invention. In FIG. 6, components corresponding to those shown in FIG. 1 will be denoted by the same reference characters as in FIG. 1. In this embodiment, the master controller 10M has a test signal generating section 30 (test signal generating unit) which generates a test signal of a sine sweep waveform. Further, the master controller 10M has an output interface portion 31 for outputting the test signal generated by the test signal generating section 30 and the torque signal applied through the torque signal input portion 7M to the outside. The data logger 52 is connected to the output interface portion 31.

Figure 7:
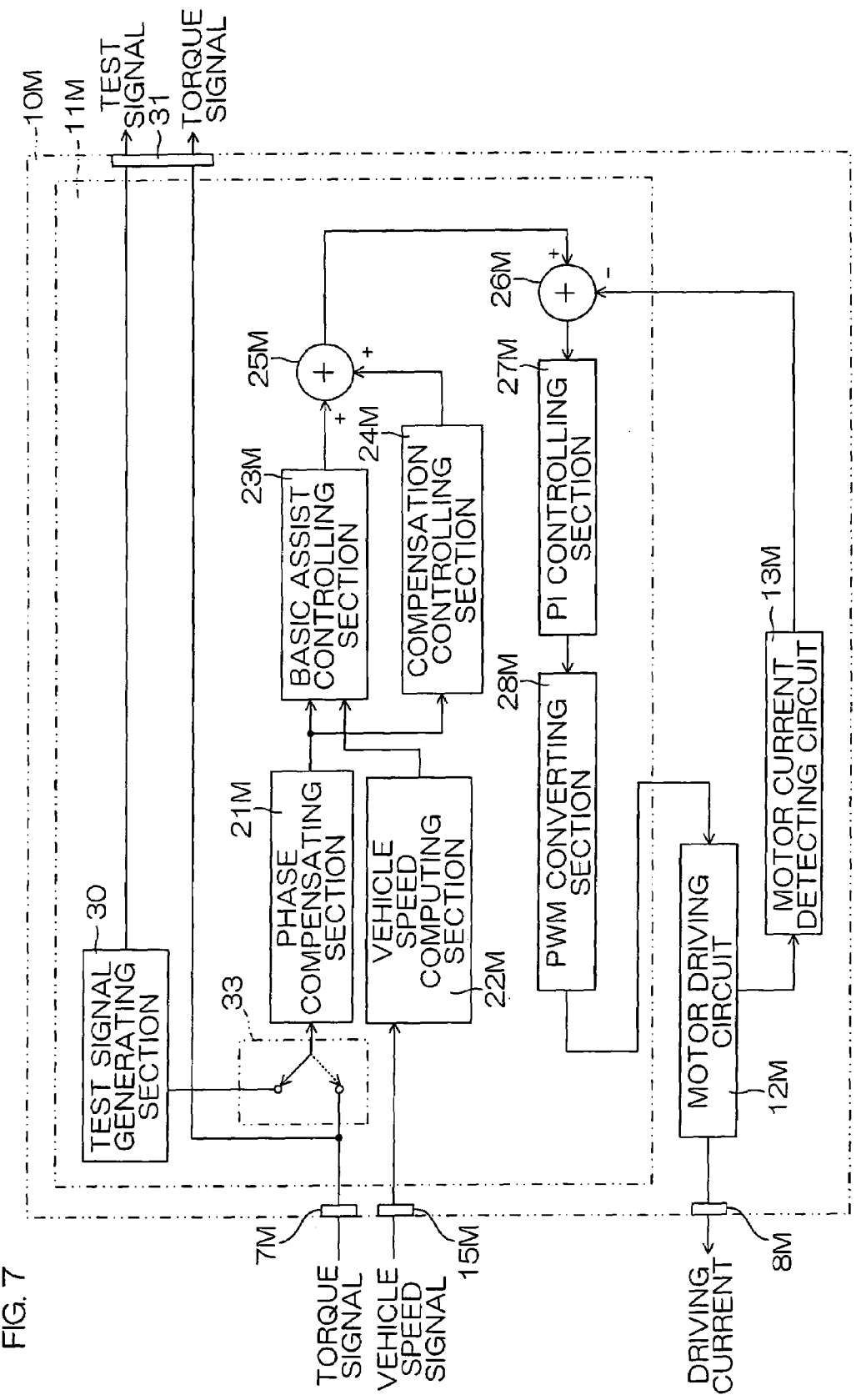
FIG. 7 is a block diagram for explaining the construction of a master controller shown in FIG. 6 by way of example.

FIG. 7 is a block diagram for explaining the construction of the master controller 10M shown in FIG. 6 by way of example. In this example, the test signal generating section 30 is embodied by the function of the microcomputer 11M. The microcomputer 11M further includes a switching section 33 serving as a functional section. The switching section 33 is switched between a first state (indicated by a broken line) in which the torque signal applied through the torque signal input portion 7M is applied to the phase compensating section 21M and a second state (indicated by a solid line) in which the test signal generated by the test signal generating section 30 is applied to the phase compensating section 21M.

When the switching section 33 is in the first state, a closed loop including the torque sensor 5, the master controller 10M and the electric motor M is formed. When the switching section 33 is in the second state, on the other hand, the driving of the electric motor M is controlled according to the test signal generated by the test signal generating section 30. As a result, the signal outputted from the torque sensor 5 is applied to the output interface portion 31. Thus, an open loop is formed.

With this arrangement, the closed loop is switched to the open loop by the function of the master controller 10M, so that the response of the electric power steering apparatus mounted in the complete motor vehicle can be applied to the data logger 52. Therefore, the operator switches the torque signal line 5a and the driving signal line 9 from the in-vehicle controller 10 to the master controller 10M and connects the data logger 52 to the output interface portion 31 to test the electric power steering apparatus.

While embodiments of the present invention have thus been described, the invention may be embodied in other forms. In the embodiments described above, the electric power steering apparatus is employed as an example of the steering apparatus. The present invention can be employed for testing a wide variety of steering apparatuses, such as steer-by-wire (SBW) systems and steering apparatuses of variable gear ratio type (VGR), which are configured to control the driving of a steering actuator according to a steering torque detection output of a torque sensor.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2007-70607 filed in the Japanese Patent Office on Mar. 19, 2007, the disclosure of which is incorporated herein by reference.

What is claimed is:

1. A testing apparatus for a steering apparatus including a torque sensor which detects a steering torque, a steering actuator which applies a steering force to a steering mechanism, and a controller which controls the steering actuator based on an output of the torque sensor, the testing apparatus comprising:
   a test signal generating unit which generates a test signal of a sine sweep waveform simulating an output signal of the torque sensor;
   a driving signal generating unit which generates a driving signal according to the test signal generated by the test signal generating unit and supplies the driving signal to the steering actuator; and a torque signal monitoring unit which acquires a torque signal outputted from the torque sensor.

2. A testing apparatus as set forth in claim 1, further comprising a processing unit which processes the torque signal acquired by the torque signal monitoring unit to generate a control parameter which defines a control characteristic of the steering actuator to be utilized by the controller.

3. A testing apparatus as set forth in claim 2, wherein the processing unit includes a unit which computes a transmission characteristic of the steering apparatus observed in a motor vehicle mounted with the steering apparatus.

4. A testing apparatus as set forth in claim 2, wherein the processing unit includes a control parameter setting unit which sets the control parameter so that a resonance point of the steering mechanism is equal to a predetermined design value.

5. A testing apparatus as set forth in claim 2, further comprising a parameter writing unit which writes the control parameter generated by the processing unit in the controller.

6. A testing apparatus as set forth in claim 2, wherein the control parameter includes a phase compensation constant to be employed for phase compensation of the torque signal outputted from the torque sensor.

\* \* \* \* \*